(No Model.)

J. H. WILSON.
ANIMAL TRAP.

No. 455,243.  Patented June 30, 1891.

WITNESSES
A. J. Schwartz
J. F. Reily

INVENTOR
Jno. H. Wilson
By W. H. Fitzgerald & Co.
Attorneys.

UNITED STATES PATENT OFFICE.

JOHN H. WILSON, OF CARMI, ILLINOIS, ASSIGNOR OF ONE-HALF TO J. J. DALES, OF SAME PLACE.

ANIMAL-TRAP.

SPECIFICATION forming part of Letters Patent No. 455,243, dated June 30, 1891.

Application filed November 10, 1890. Serial No. 370,886. (No model.)

*To all whom it may concern:*

Be it known that I, JOHN H. WILSON, a citizen of the United States, residing at Carmi, in the county of White and State of Illinois, have invented certain new and useful Improvements in Animal-Traps; and I do hereby declare the following to be a full, clear, and exact description of the invention, such as will enable others skilled in the art to which it appertains to make and use the same.

My invention consists in a new and improved animal-trap, which is especially intended to be used both as a rat and mouse trap, a large size being employed for a rat-trap and a small size of precisely the same construction for a mouse-trap; and the invention will be hereinafter fully described and claimed.

Figure 1:
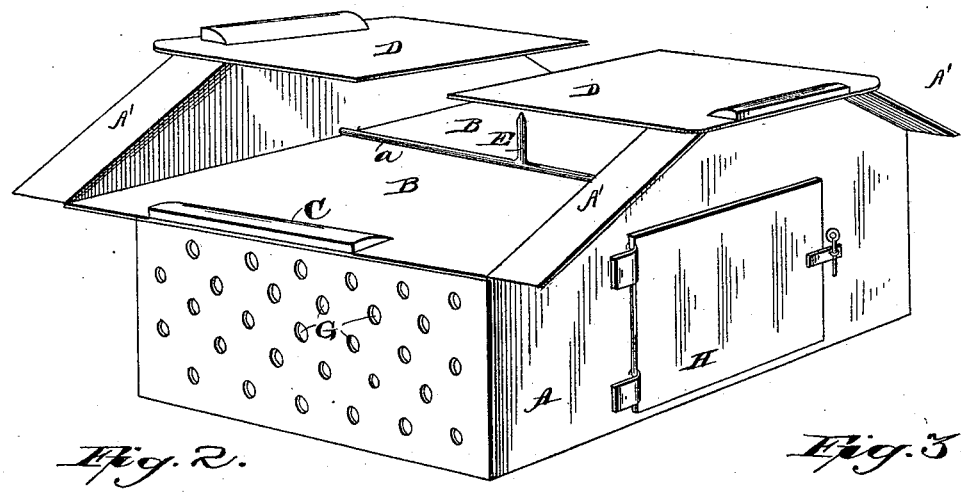
Figure 2:
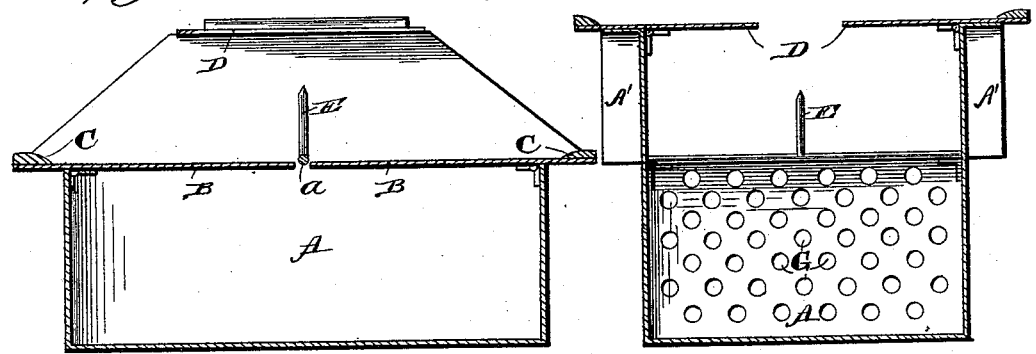
Figure 3:
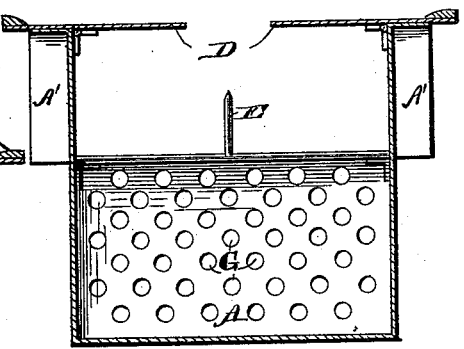
Figure 4:
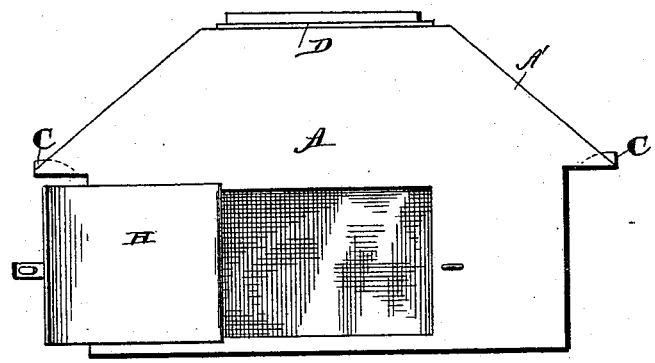

Referring to the accompanying drawings, Figure 1 is a perspective view of my new and improved animal-trap. Fig. 2 is a longitudinal vertical sectional view of the same. Fig. 3 is a transverse vertical sectional view, and Fig. 4 is a side elevation.

Referring to the several parts by letter, A indicates the rectangular body of the trap, which may be made of any suitable material. The top of the box or body A is covered by the doors B B, the outer ends of which project out beyond the ends of the box, and the doors are pivoted or hinged on the upper edges of the ends of the box. If preferred, however, these doors may be hinged on transverse rods arranged at a suitable distance inside the ends of the box, as will be readily understood. The inner ends of the doors, it will be seen, are at least three times the length of their outer ends, and to counterbalance the weight of this inner portion I secure upon the outer ends of the doors weights C, or the said ends may be weighted in any suitable manner. The sides of the box or trap are extended up, as shown, above the level of the doors B, and their upper edges are bent out at right angles to form walks or footways A' A', and upon the flanged tops of the sides are pivoted or hinged the doors D, the outer ends of which are weighted after the manner of the doors B. The inner ends of the upper doors D project over the top of the box, and a wire E projects up from a cross-piece *a*, arranged transversely across the center of the box-top. On this wire the bait is placed, and a suitable bait is also placed inside of the box under the door of the same.

The operation of the trap will be readily understood. The mouse in endeavoring to reach the bait, runs upon the inner ends of either the upper doors D or the lower doors B, and in either case their weight overbalances the weight of the outer end of the doors, causing the door on which they step to swing down at its inner end, precipitating them down into the trap, when the door by its own weight automatically closes, securing them in the trap, so that it is impossible for them to escape, and resetting itself for the next visitor. The upper edge flanges A' give convenient access for the mouse or rat, on which it can walk from the outer ends of the lower doors B up to the elevated doors D.

The ends of the trap-body may be formed with a series of perforations G, so that by holding up the trap and looking through the same one can see whether anything has been caught in it without opening the door.

One side of the trap-body is provided with a hinged door H, through which the mouse or rat is removed from the trap.

From the foregoing description, taken in connection with the accompanying drawings, the construction, operation, and advantages of my invention will be readily understood.

It will be seen that my new and improved animal-trap is very simple and strong in construction and exceedingly effective in its operation. It will capture any number of mice or rats that the body of the trap will contain, as the bait is never touched by the animal, who falls into the trap before it can reach it, and the weighted door automatically sets itself as soon as one rat or mouse has been captured.

The trap is designed to be made of many different sizes, according to the kind of animal which it is intended to trap.

Having thus described my invention, what I claim, and desire to secure by Letters Patent, is—

1. The combination of the body A, having the upwardly-extending side pieces, the upper edges of which are bent over to form inclined walks or approaches A' A', the side doors D, hinged on the top of the side pieces, and the cross-rod a, arranged across the body A below the level of the doors D and having the central projecting bait-wire E, substantially as set forth.

2. The combination of the body A, having the perforated ends, the upwardly-extended side pieces having their upper edges bent over to form the walks or approaches A' A' and the side door, the weighted doors D, hinged on the top of the side pieces, the cross-rod a, having the bait-wire E, and the weighted door B, pivoted on the ends of the body A, substantially as set forth.

In testimony whereof I affix my signature in presence of two witnesses.

JOHN H. WILSON.

Witnesses:
BENJ. S. ORGAN,
WESLEY MCCALLISTER.